United States Patent [19]

Scharf

[11] 4,085,240

[45] Apr. 18, 1978

[54] PROCESS FOR IMPROVING THE ADHESION OF COATINGS OF VULCANIZED EPDM ARTICLES

[75] Inventor: Helmut Scharf, Schermbeck, Germany

[73] Assignee: Chemische Werke Huels, A.G., Marl, Germany

[21] Appl. No.: 717,461

[22] Filed: Aug. 24, 1976

[30] Foreign Application Priority Data

Aug. 28, 1975 Germany .............................. 2538218

[51] Int. Cl.² .......................... B05D 1/36; B05D 7/02
[52] U.S. Cl. ...................................... 427/302; 427/333
[58] Field of Search ............... 427/302, 333; 428/423, 428/425

[56] References Cited

U.S. PATENT DOCUMENTS

| 3,813,257 | 5/1974 | West | 427/302 X |
| 3,892,885 | 7/1975 | Bragole | 427/302 X |
| 3,991,255 | 11/1976 | Blaskiewicz et al. | 427/302 X |

FOREIGN PATENT DOCUMENTS 908,188  10/1962  United Kingdom ................. 427/302

*Primary Examiner*—James R. Hoffman
*Attorney, Agent, or Firm*—Millen & White

[57] ABSTRACT

A process for improving the adhesion of isocyanate-crosslinked polyester coatings on vulcanized articles of ethylene-α-olefin-diene terpolymers, characterized in that the vulcanized articles, which contain at least 30 parts by weight of carbon black per 100 parts by weight of the ethylene-α-olefin-diene terpolymer, are treated with a compound having a functional group reactive with isocyanates and a carbon structure with at least 4 carbon atoms.

8 Claims, No Drawings

PROCESS FOR IMPROVING THE ADHESION OF COATINGS OF VULCANIZED EPDM ARTICLES

BACKGROUND OF THE INVENTION

This invention relates to a process for improving the adhesion of isocyanate-crosslinked polyester coatings on vulcanized articles made from ethylene-α-olefin-unconjugated diene terpolymers (EPDM).

In the metal working industry, predominantly in the automobile industry, increasing use is made — inter alia for reasons of safety — of coated elastomer components, e.g., bumpers, facings, decorative moldings, radiator grilles and fenders. Due to advantageous properties such as high temperature stability and high elasticity at relatively low temperatures, vulcanized articles made from ethylene-α-olefin-unconjugated diene terpolymers have proven to be particularly expedient elastomers for this utilization. However, these vulcanizates have the drawback that they normally cannot be provided with a firmly adhering coating without a pretreatment of the surface or admixture of suitable components before the molding and vulcanizing steps. Additionally, such utilization requires that the coating adhere firmly to the vulcanizate substrate even if the coated component is elastically deformed at low temperatures, e.g., about $-29°$ C.

Many attempts have heretofore been made to improve adhesion to the surface of vulcanized articles, primarily of ethylene-propylene-diene elastomers, with respect to coatings and/or to enhance the adhesive power of the coatings. However, the presently available prior-art processes all have greater or lesser disadvantages.

Thus, in the process described in DOS (German Unexamined Laid-Open Application) Nos. 2,403,663, the vulcanized elastomer components are readied for coating by adding a halogenated elastomer to the elastomer to be vulcanized. In accordance with the procedure of DOS No. 2,364,494, vulcanizates amenable to coating are obtained by adding a phenol-aldehyde resin to the elastomer. An inherent disadvantage of these methods is that the component improving the adhesion between the substrate surface and the coating is distributed over the entire article to be coated, thereby making the elastomer relatively expensive.

It is furthermore known to improve the adhesion of vulcanized articles made from EPDM elastomer by treatment with ozone, e.g., see DOS No. 2,402,214; peroxydisulfate heavy metal salts, e.g., see DAS (German Published Application) No. 2,022,918; or chromosulfuric acid, e.g., see DOS No. 2,241,413. However, the coatings of the thus-pretreated shaped articles do not meet all of the necessary requirements. Besides, these processes have the additional drawback of requiring the handling of aggressive chemicals, thereby resulting also in waste air and wastewater disposal problems.

The process which seems to be most frequently employed at present is described in DAS No. 2,063,259; SAE.Meet.Automot. Eng., Jan. 1973:1-12 and contains the following process steps: The molded articles to be coated are washed with detergents, repeatedly rinsed with water, dried, sprayed with an organic solution of benzophenone and then vigorously dried. The thusprepared articles are subsequently heated by means of infrared lamps to a temperature above the melting point of benzophenone and the heated article is irradiated with ultraviolet light. After irradiation, the articles are ready to be coated. Optionally, the irradiation period can be shortened if a highly concentrated isocyanate solution is additionally applied.

This process has the disadvantages of employing relatively a large number of process steps, of liberating organic solvents during the procedure, and of being utilizable only with difficulties or not at all in case of components having a complicated configuration with corners and cavities, due to the linear light propagation.

Therefore, there is a genuine need in the art for methods to reduce and/or eliminate the disadvantages of such prior-art processes.

OBJECTS OF THE INVENTION

Accordingly, it is a general object of this invention to provide a process for improving the adhesion of isocyanate-crosslinked polyester coatings on vulcanized articles made from ethylene-α-olefin-unconjugated diene terpolymers (EPDM).

Another object of this invention is to provide such a process which does not require pretreatment of the substrate surface prior to molding.

A further object of this invention is to provide such a process which does not require additional elastomer components in the coating employed.

An additional object of this invention is to provide such a process which is suitable for coating irregularly shaped substrates.

A more particular object of this invention is to provide such a process which does not require handling or disposal of dangerous chemicals.

Other objects and advantages of this invention will become apparent to those skilled in the art upon further study of the specification and appended claims.

SUMMARY OF THE INVENTION

Briefly, the above and other objects are attained in one aspect of this invention by providing a process for improving the adhesion of isocyanate-crosslinked polyester coatings on vulcanized articles of ethylene-α-olefin-diene terpolymers, characterized in that the vulcanized articles, which contain at least 30 parts by weight of carbon black per 100 parts by weight of the ethylene-α-olefin-diene terpolymer, are treated with a compound having a functional group reactive with isocyanates and a carbon structure with at least 4 carbon atoms.

DETAILED DESCRIPTION

It has now been discovered that it is possible to improve, in a simple and economical manner, the adhesion of isocyanate-crosslinked polyester coatings onto vulcanized articles made from ethylene-α-olefin-unconjugated diene terpolymers by treating the vulcanized articles, which contain at least 30 parts by weight of carbon black per 100 parts by weight of the ethylene-α-olefin-unconjugated diene terpolymer, with a compound having a functional group reaction with isocyanates and a carbon atom structure with at least 4 carbon atoms.

Within the scope of this invention, ethylene-α-olefin-unconjugated diene terpolymers are understood to mean elastomers consisting of 30–89.5% by weight of ethylene, 69.5–10% by weight of α-olefin, e.g., propylene, butene-1 or 1-hexene, preferably propylene, and 0.5–10% by weight of an unconjugated diene. Preferred unconjugated dienes are cis- and trans-1,4-hexadiene, dicyclopentadiene, 5-methylene-, 5-ethylidene- and 4-isopropylidene-2-norbornene and alkenyl-2-norbornenes. The ethylene-α-olefin-unconjugated diene terpolymers are produced according to conventional methods of the prior art, e.g., see German Patent No. 1,595,442; DOS No. 1,595,695; and DOS No. 1,720,385.

It is essential for this invention that, prior to the vulcanization, at least 30 parts by weight, preferably 75 to 200 parts by weight, of carbon black, based on 100 parts by weight of EPDM, is added to the aforementioned terpolymers. Optionally, it is also possible to add 10–100 parts by weight of an oil, again based on 100 parts by weight of EPDM, and additives of the customary type and quantity generally employed in the rubber technology.

Preferred fillers are the carbon blacks customary in the rubber industry, which include carbon blacks of all stages of activity; suitable carbon blacks include but are not limited to SAF (super abrasion furnace), ISAF (intermediate super abrasion furnace), HAF (high abrasion furnace), FEF (fast extruding furnace) and MT (medium thermal) blacks. In addition to or in place of one or more carbon blacks, it is also possible to incorporate mineral substances, e.g., highly active silicic acid, kaolin, ground slate, etc.

Suitable mineral oil plasticizers are the refinery products customarily employed for this purpose which, depending on the purpose for which they are to be used, can contain aromatic, naphthenic or paraffinic hydrocarbons.

A primarily suitable vulcanizing agent is sulfur in combination with known vulcanization accelerators with the addition of zinc oxide and higher fatty acids, e.g., stearic acid.

The various additives can be incorporated by means of conventional mixing units, such as rolling mills or masticators, into the ethylene-α-olefin-unconjugated diene terpolymers. During or after the shaping step, the articles are then vulcanized in a conventional manner.

The vulcanized articles are then treated, for improving the adhesion with respect to the subsequently applied coating, in accordance with the invention with a compound having a functional group reactive with isocyanates. Such compounds can be described, for the largest part, by the general formula RX.

In this formula, R can be a linear or branched alkyl, alkenyl, alkylaryl, alkenylaryl, alkylcycloalkyl, alkenylcycloalkyl, alkylcycloalkenyl, or alkenylcycloalkenyl residue of 4–20, preferably 12–18, carbon atoms in the primary chain and up to 20, preferably 2, carbon atoms in the side chains; and X can be a $-NH_2$, $-NHR'$, $-CONH_2$, $-NHCONH_2$, $-NHCOOR'$, $-OH$, $-SH$, $-SO_3H$, $-OCOCH_2COOR'$, $-COOCH_2CHOHCH_2OH$, $-COOCH_2CH_2OH$ or $-COOH$ group, wherein R' is methyl or ethyl. The functional groups reactive with isocyanates can, when chemically possible, also be expanded by one to two molecules of ethylene oxide, e.g., $-OCH_2CH_2OCH_2CH_2OH$ or $-CONHCH_2CH_2OH$. Preferred classes of compounds are fatty alcohols, fatty acid amides, fatty acid ethanolamides and the monofatty acid esters of ethylene glycol and/or glycerol, wherein the fatty acids have 12–20 carbon atoms in the carbon structure. Especially suitable compounds are 2-ethylhexanol, dodecanol, dodecylamine, ethylene glycol monolaurate, glycerol monostearate and coconut acid diethanolamide, preferably used individually but which can be used as admixtures of two or more.

The compounds usable in the process of this invention can be applied to the surface of the articles of ethylene-α-olefin-unconjugated diene terpolymers from the liquid phase as well as the gaseous phase. However, application from the liquid phase is preferred. In this case, the compound can be present in the pure form as well as in solution. When solutions are employed, the concentration of the compound critical to the process is dependent on its solubility and/or miscibility with the solvent used. In this connection, concentrations of between 0.1 and 5% by weight are especially preferred. Care must be taken in the choice of the solvent to employ one which does not superficially dissolve the article of vulcanized EPDM elastomer during the treatment period, or does so only to a minor extent. Preferred solvents are water, methanol, ethanol, acetone and ethyl acetate.

A substantial advantage of the process according to this invention is that it is possible, by the selection of the compounds capable of reacting with isocyanates, to conduct the washing step customary in prior-art processes and the treatment procedure critical to this method in a single operating step. The temperature at which the treatment of this invention suitably takes place and the duration of the treatment are dependent on the degree of contamination of the surface of the article to be treated, as well as the type of contamination, and on the chemical character of the treatment medium. The optimum conditions can be readily determined by a few preliminary experiments such as shown in the following Examples. In general, the treatment period ranges between one second and twenty minutes.

The washing step and the treatment process of this invention can, of course, also be conducted separately. In this case, the active materials employed in the two procedures, i.e., the detergent on the one hand and the compound capable of reacting with isocyanates on the other hand, can be identical. In general, the procedure during the two-stage treatment of the vulcanized articles to be subsequently coated employs a rinsing step, e.g., with water or alcohol, immediately after the washing process. The necessity for this step depends on both the amount of impurities deposited on the article after the washing process and on the particular laundry-active substance utilized. After the rinsing step, the articles can be dried, but preferably they are treated without intermediate drying in accordance with this invention at room temperature with a compound having an isocyanate-reactive functional group as described herein. This treatment normally lasts 1 second to 5 minutes, preferably to 60 seconds. The articles can subsequently be allowed to dry in the air, although when using water as the solvent a more vigorous drying step is sometimes expedient. The thus-prepared articles can be passed on to the intended coating operation without any further treatment. It is advantageous to effect the coating immediately after the treatment according to the invention, so that the desired and attained effect of improved adhesion does not lose any effectiveness by intermediate storage.

A polyurethane based coating agent, e.g., isocyanate-crosslinked polyester, is applied to the surface treated according to this invention by means of spraying, dipping or spreading method. Suitable polyesters which can be employed are well known in the art and described, inter alia, in DOS No. 1,805,189. Suitable isocyanates can be di- and/or polyfunctional commercial products, e.g., polyfunctional aliphatic and aromatic isocyanates, isophorone diisocyanate or trimethylhexamethylene diisocyanate.

The advantages attained by the process of this invention are primarily that generally only a single operating step is required to achieve a very good adhesion between the coating on the basis of isocyanate-crosslinked polyesters and the vulcanized article of an ethylene-α-olefin-unconjugated diene terpolymer; that no devices besides a dipping bath are required; that it is possible by means of this process to treat even articles of a complicated configuration without additional complications; and that the process is extraordinarily inexpensive.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

A. Production of the EPDM Test Specimens

Plates having the dimensions of 10 × 4 × 0.4 cm. were manufactured from the following mixture (quantitative data in parts by weight):

| | |
|---|---|
| Ethylene-propylene-5-ethylidene-2-norbornene terpolymer (63% by weight ethylene; 31% by weight propylene, 6% by weight 5-ethylidene-2-norbornene; Mooney value $ML_{1+4}$ [at 100° C.] = 84) | 100 |
| FEF [Fast extruding furnace] black | 30 |
| SRF [Semireinforcing furnace] black | 120 |
| Naphthenic oil | 17 |
| Chloroparaffin (70% by weight of chlorine) | 6 |
| Fatty acid zinc salts | 5 |
| Zinc oxide | 5 |
| Stearic acid | 1 |
| Benzothiazyl-2-cyclohexylsulfenamide | 1.75 |
| Tetramethylthiuram monosulfide | 0.25 |
| Sulfur | 1.5 |

The vulcanizing time was 5 minutes at 180° C. The specimens produced under these conditions were then treated as described in detail below.

B. Cleaning, and Treatment of Specimens According to This Invention

The cleaning step (washing with a laundry-active substance) and the treatment in accordance with this invention with a compound having a functional group reactive with isocyanates were conducted by the dipping method under the conditions set forth in the examples and comparative examples.

C. Coating of the Specimens Treated According to This Invention

A coating agent on polyurethane basis was used for the coating step, with the following composition:

74 parts of a commercial, saturated polyester ("VESTURIT" 905) and 24 parts of a commercial polyurethane ("DESMODUR" N 100). The two components were mixed immediately prior to the coating step. The finished coating composition was poured onto the specimens and leveled with a 100 μ doctor blade. The coating was cured at 100° C. within 30 minutes. The coating was tested after 20 hours of storage at 25° C.

D. Testing Methods

The adhesion of the coatings was tested in accordance with the crisscross cut test (DIN [German Industrial Standard] 53 151). The following grading method was utilized: If, among 81 possible coating fragments, none could be torn off, the specimen received grade 1; in case of < 5 coating fragments, grade 2; in case of < 10 coating fragments, grade 3; in case of < 20 coating fragments, grade 4; and in case of > 20 coating fragments, grade 5.

To evaluate the adhesive power, a "swing test" was furthermore conducted. In this test, two parallel cuts were made in the plates (length: 10 cm.) in the direction of the flexing at a spacing of 1 mm. and the plates were flexed toward both sides until their ends came into contact with each other for 20 successive times. The detachment of the coating was graded as follows: Grade 1 — no detachment of the coating, no creasing; grade 2 — a few creases having a height of < 0.5 mm. and a width of < 0.5 mm.; grade 3 — several creases having a height and width of < 1 mm.; grade 4 — creases having a height and width of < 2 mm.; and grade 5 — coating is detached over larger areas.

EXAMPLES 1-4

Specimens prepared in accordance with (A) were dipped for 0.5, 2, 10, and 20 minutes into boiling, 1%-strength aqueous solutions of dodecylbenzenesulfonic acid; after the dipping step, the specimens were air dried at about 60° C. and then coated as indicated in (C). The tests according to (D) resulted in grade 1 for all of the specimens.

EXAMPLES 5 and 6

Two specimens, prepared according to (A), were dipped for 10 minutes at room temperature into 1%-strength ethanolic solutions of dodecylbenzenesulfonic acid and coconut acid diethanolamide; after the alcohol had been evaporated, the specimens were coated as indicated in (C) and tested in accordance with (D). In both tests, the specimens received grade 1.

EXAMPLES 7-10

Specimens prepared in accordance with (A) were dipped for 10 minutes into boiling ethyl acetate solutions of lauric acid monoethanolamide, coconut acid diethanolamide, stearic acid amide and glycerol monostearate. In each case, the solutions were of 1% strength. After the dipping step, the specimens were dried in the air and coated as set forth in (C). The tests conducted according to (D) resulted in grade 1 for all of the specimens.

EXAMPLES 11-13

Three specimens prepared as described in (A) were dipped respectively for 10 minutes into 2-ethylhexanol solutions, namely at 100° C. into pure 2-ethylhexanol (Example 11); into a boiling, 1%-strength ethanolic solution (Example 12); and into a 1%-strength solution at room temperature (Example 13). After drying, the specimens were coated as indicated in (C). The crisscross cut test values resulted in grade 1 for all three specimens. The swing test yielded grade 1 in case of Example 11; grade 2 in case of Example 12; and grade 3 in case of Example 13.

EXAMPLES 14-19

Six specimens prepared in accordance with (A) were dipped for 10 minutes into a boiling, 5%-strength aqueous solution of dodecylbenzenesulfonic acid, rinsed with water at room temperature and then dipped for 1 minute at room temperature into 1% ethanolic solutions of stearic acid amide (Example 14); lauric acid monoethanolamide (Example 15); coconut acid diethanolamide (Example 16); glycerol monostearate (Example 17); 2-ethylhexanol (Example 18); and dodecylbenzenesulfonic acid (Example 19). After evaporation of the alcohol, the specimens were coated with the polyurethane coating agent described in (C), the coating was cured at 100° C. for 30 minutes and the adhesion was tested 20 hours later as indicated under (D). All of the specimens received grade 1 in both tests.

With the use of methanolic or acetone solutions in place of the ethanolic solutions, the coating tests did not yield any altered results.

EXAMPLE 20

A specimen, produced as described in (A), was dipped for 10 minutes into a boiling 5%-strength aqueous solution of dodecylbenzenesulfonic acid, dried for 3 minutes in air at room temperature, dipped into ethanol for 1 minute at room temperature and coated after evaporation of the alcohol. The grade was 1 in both tests.

EXAMPLES 21-25

Five specimens prepared according to (A) were dipped for 10 minutes into a boiling 5% aqueous solution of a commercial household detergent ("PERSIL"), rinsed with water at room temperature and then dipped for 1 minute at room temperature into 1% ethanolic solutions of lauric acid monoethanolamide; coconut acid diethanolamide; stearic acid amide; glycerol monostearate; and laurylamine. After evaporation of the alcohol, the specimens were coated as set forth in (C) and tested according to (D). All of the tests resulted in grade 1.

When the coating step was conducted on specimens which has merely been washed and rinsed, no coating adhesion was obtained.

COMPARATIVE EXAMPLE 1

Specimens were prepared from a mixture consisting of 100 g. of EPDM elastomer as described under (A), 1.5 g. of sulfur, 1.75 g. of benzothiazyl-2-cyclohexylsulfenamide, and 0.25 g. of tetramethylthiuram monosulfide (dimensions: 10 × 4 × 0.4 cm.). The vulcanizing time was 5 minutes at 180° C. A specimen was dipped for 10 minutes into a boiling, 5% aqueous solution of dodecylbenzenesulfonic acid, rinsed with water and then dipped for 1 minute at room temperature into a 1% ethanolic solution of dodecylbenzenesulfuric acid. The dried specimen was coated in accordance with (C) and tested according to (D). In the crisscross cut test, the specimen received grade 5 and in the swing test grade 3.

COMPARATIVE EXAMPLES 2 AND 3

Two specimens, prepared as described in (A), were dipped for 15 minutes at 80° C. (Comparative Example 2) and for 30 minutes at room temperature (Comparative Example 3) into concentrated chromosulfuric acid, rinsed with water and dried. Subsequently, the specimens were coated according to (C) and tested as set forth in (D). In the crisscross cut test, the specimens received grade 1 and in the swing test grade 3 for EXAMPLE 2 and grade 5 for Example 3.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process which comprises the steps of applying to the surface of an article formed from a vulcanizate of a 30-89.5% by weight ethylene — 69.5-10% by weight α-olefin - 0.5-10% by weight unconjugated diene terpolymer elastomer and at least 30 parts by weight of carbon black filler per 100 parts by weight of elastomer, a compound having a functional group reactive with isocyanates, said compound being of the general formula RX wherein R is linear or branched alkyl, alkenyl, alkylaryl, alkenylaryl, alkylcycloalkyl, alkenylcycloalkyl, alkylcycloalkenyl or alkenylcycloalkenyl of 4-20 carbon atoms in the primary chain and up to 20 carbon atoms in the side chains, and X is $-NH_2$, $-NHR'$, $-CONH_2$, $-NHCONH_2$, $-NHCOOR'$, $-OH$, $-SH$, $-SO_3H$, $-OCOCH_2COOR'$, $-COOCH_2CHOHCH_2OH$, $-COOCH_2CH_2OH$ or $-COOH$ wherein R' is methyl or ethyl, thereby rendering the surface more adhesible to isocyanate-cross-linked polyester coatings, and then applying an isocyanate cross-linked polyester coating to the thus-treated article.

2. A process according to claim 1, wherein the compound of general formula RX is an amide, a mono- or diethanolamide of a fatty acid of 12-20 carbon atoms, or an ethylene glycol ester or glycerol ester of a fatty acid of 12-20 carbon atoms.

3. A process according to claim 1, wherein the compound of general formula RX is selected from the group consisting of 2-ethylhexanol, dodecanol, dodecylamine, ethylene glycol monolaurate, glycerol monostearate, coconut acid diethanolamide and mixtures thereof.

4. A process according to claim 1, wherein the unconjugated diene selected from the group consisting of cis- and trans-1,4-hexadiene, dicyclopentadiene, 5-methylene-, 5-ethylidene- and 5-isopropylidene-2-norbornene and alkenyl-2-norbornenes.

5. A process according to claim 4, wherein the vulcanized elastomer contains 72-200 parts by weight carbon black per 100 parts by weight of elastomer.

6. A process according to claim 5, wherein said α-olefin is propylene.

7. A process according to claim 6, wherein the compound of general formula RX is an amide, a mono- or diethanolamide of a fatty acid of 12-20 carbon atoms, or an ethylene glycol ester or glycerol ester of a fatty acid of 12-20 carbon atoms.

8. A process according to claim 6, wherein the compound of general formula RX is selected from the group consisting of 2-ethylhexanol, dodecanol, dodecylamine, ethylene glycol monolaurate, glycerol monostearate, coconut acid diethanolamide and mixtures thereof.

* * * * *

UNITED STATES PATENT AND TRADEMARK OFFICE
CERTIFICATE OF CORRECTION

PATENT NO. : 4,085,240
DATED      : April 18, 1978
INVENTOR(S) : Helmut Scharf

It is certified that error appears in the above-identified patent and that said Letters Patent are hereby corrected as shown below:

Claim 5, Line 47:  reads "contains 72-200"
                   should read--contains 75-200--.

Signed and Sealed this

Twenty-ninth Day of August 1978

[SEAL]

Attest:

RUTH C. MASON
Attesting Officer

DONALD W. BANNER
Commissioner of Patents and Trademarks